A. F. WILLIAMS.
END GATE FASTENER.
APPLICATION FILED DEC. 22, 1908.
930,585.
Patented Aug. 10, 1909.
2 SHEETS—SHEET 1.
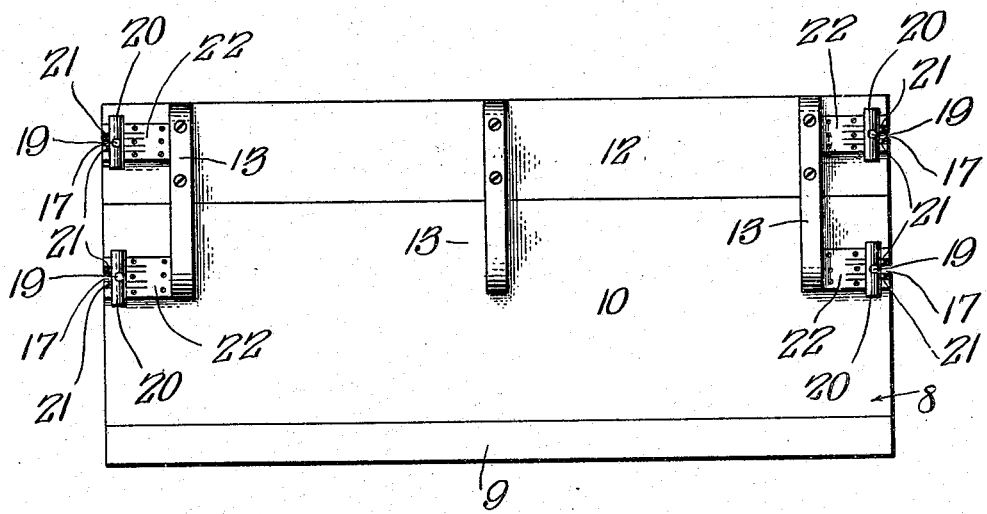
Fig. 1.
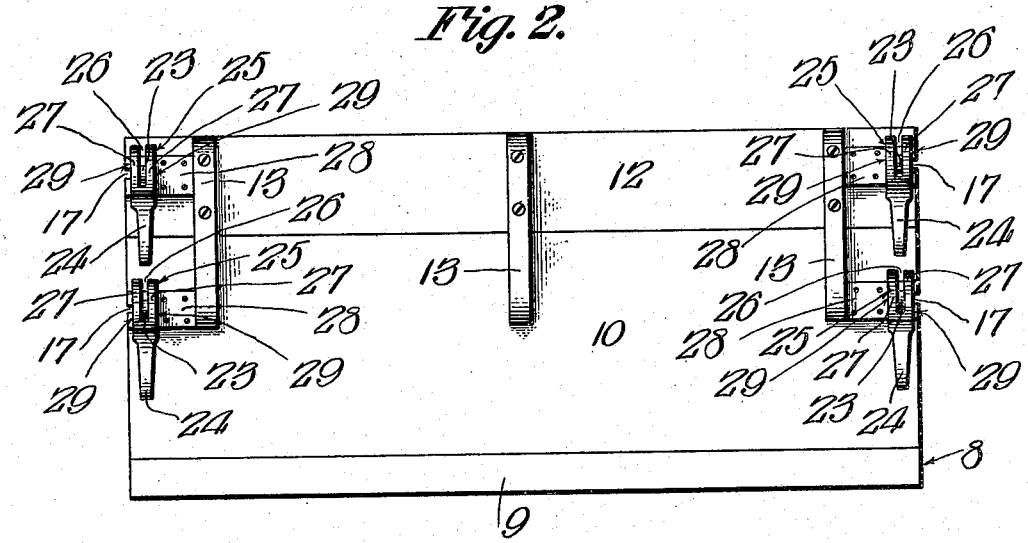
Fig. 2.
Witnesses
Chas C. Richardson
Inventor
Alexander F. Williams,
By 
Attorneys.

A. F. WILLIAMS.
END GATE FASTENER.
APPLICATION FILED DEC. 22, 1908.

930,585.

Patented Aug. 10, 1909.
2 SHEETS—SHEET 2.

Inventor
Alexander F. Williams,

Witnesses
Chas. C. Richardson
F. O. Fowler

By Chandler & Chandler
Attorneys

UNITED STATES PATENT OFFICE.

ALEXANDER F. WILLIAMS, OF VICTOR, COLORADO.

END-GATE FASTENER.

No. 930,585. Specification of Letters Patent. Patented Aug. 10, 1909.

Application filed December 22, 1908. Serial No. 468,818.

*To all whom it may concern:*

Be it known that I, ALEXANDER F. WILLIAMS, a citizen of the United States, residing at Victor, in the county of Teller, State of Colorado, have invented certain new and useful Improvements in End-Gate Fasteners; and I do hereby declare the following to be a full, clear, and exact description of the invention, such as will enable others skilled in the art to which it appertains to make and use the same.

The invention relates to an end gate fastener and more particularly to the class of fastening devices for end or tail gates of wagons, trucks or the like.

The primary object of the invention is the provision of an end or tail gate fastener by which the end or tail gate of a wagon is firmly held in a closed position within the latter so as to prevent the rattling and displacement of the gate by jolting or jarring of the wagon or the like during the travel thereof.

Another object of the invention is the provision of a fastening device for end or tail gates of wagons in which the side and end walls of the latter are held against accidental displacement should any sudden jolts or jars occur during the travel of the wagon or the like and to prevent the walls thereof from bulging or separating at their joined ends when supporting a heavy or excessive load of material within the body of the wagon or the like.

A further object of the invention is the provision of an end or tail gate fastener which is simple in construction, durable, easily and quickly manipulated, efficient in operation, and inexpensive in the manufacture.

With these and other objects in view the invention consists in the construction, combination and arrangement of elements or parts as will be hereinafter fully described in detail, illustrated in the accompanying drawings which disclose the preferred form of embodiment of the invention and as brought out in the appended claim.

Figure 3:
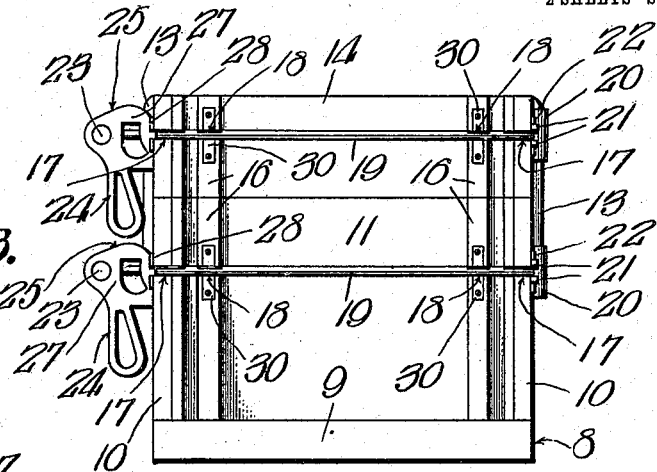
Figure 4:
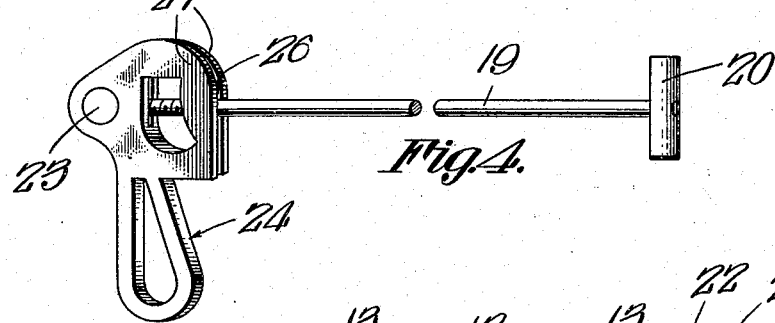
Figure 5:
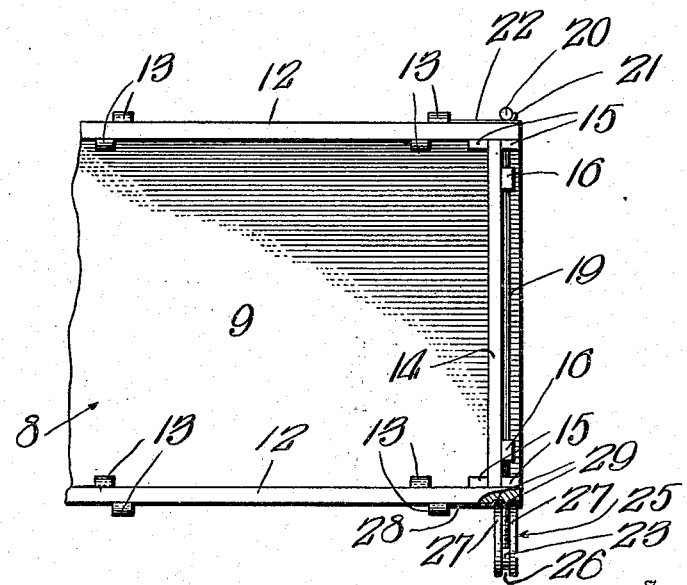

In the drawings Figure 1 is a side elevation of a wagon body with the invention applied thereto. Fig. 2 is an opposite side elevation. Fig. 3 is an end elevation. Fig. 4 is a perspective view of the tie rod and clamp. Fig. 5 is a fragmentary top plan view of one end of the wagon body.

Similar reference characters indicate corresponding parts throughout the several views in the drawings.

In the drawings, the numeral 8 designates generally a wagon body which comprises a bottom 9, lower side walls or boards 10, and end or tail gates 11. Mounted upon the upper longitudinal edges of the lower side boards or walls 10 are removable upper or supplemental side boards 12 which latter have secured thereto on opposite faces depending cleats 13 to engage the lower side boards or walls so as to prevent lateral displacement and enable the mounting of the upper side boards thereon. Superposed upon each end or tail gate 11 is a supplemental tail or end gate 14 which latter and the supplemental side boards or walls are provided to increase the hauling capacity of the wagon body when the occasion demands.

At opposite ends and secured to the inner faces of the upper and lower side boards or walls are spaced guide strips 15 between which are adapted to slide the end or tail gates 11 and 14 so that the same can be brought to a closed position or removed from the wagon body. On the outer faces near opposite edges of the end or tail gates 11 and 14 are secured reinforcing bars or strips 16 which latter serve to strengthen the same and prevent the splitting or destruction thereof when encountered with rough usage.

In the end edges of the upper and lower side boards or walls 10 and 12 are formed registering recesses 17 with which latter aline recesses 18 formed in the reinforcing strips 16 on the end or tail gates and within which recesses are adapted to be mounted tie rods 19 each having formed at one end a cross head 20 which latter is adapted to be brought into engagement with hook spring fingers 21 formed integral with and cut from bearing plates 22 which are secured to the outer faces of both upper and lower side boards or walls 10 and 12. The opposite end of each tie rod 19 is threaded to engage and permit adjustment of a pivot 23 to which is eccentrically connected a clamping lever 24 which latter is provided with a cam head 25 having a slot 26 which virtually causes said head to consist of two cheek plates 27 to permit movement of the lever 24 and to accommodate the tie rod 19 therebetween.

Secured to the outer faces of the upper and lower side boards or walls 10 and 12 are bearing plates 28 each of which has formed therein spaced parallel grooves or channels 29 which are engaged by the cheek plates 27 of the cam head 25 when the lever is shifted in one direction to securely lock the tie rod 19 in its working position across the body of the wagon to hold the end or tail gate against displacement.

Secured to the reinforcing bars or strips 16 are metal wearing straps 30 which underlie the tie rod 19 when mounted in the recesses 18 so as to prevent said tie rod from wearing away the wood structure or material forming the end or tail gate.

It is obvious that due to the spring fingers 21 engaging the cross head of the tie rod 19 the same will serve to tension the latter when the lever 24 has been shifted to lock the tie rod in the wagon body so as to prevent the said lever from becoming accidentally unlocked which would result in the freeing of the tie rod from the wagon body.

What is claimed is—

In a tail gate fastener, the combination with a wagon body and its tail gate of guide cleats secured to opposite inner faces of the body near one end thereof for detachably receiving the tail gate, bearing plates secured exteriorly to opposite sides of the wagon body, outwardly curled spring fingers formed on one of said plates, the other of said plates containing spaced parallel grooves, cleats fixed to the tail gate and containing alining notches, a tie rod fitted in said notches and extending across the end of the wagon body, a cross head fixed to one end of the tie rod and engaged by the spring fingers, a pivot member adjustably threaded on the opposite end of the tie rod, and a lever mounted upon said pivot member and having spaced parallel cam cheeks adapted to engage the grooves in one bearing plate when the lever is actuated in one direction to lock the tie rod against displacement.

In testimony whereof, I affix my signature, in presence of two witnesses.

ALEXANDER F. WILLIAMS.

Witnesses:
 CHAS. M. STRICKLER,
 BRUCE V. WILLIAMS.